Dec. 24, 1963 G. HUSS 3,115,103
DOUGH-FORMING MACHINE
Filed Jan. 8, 1962
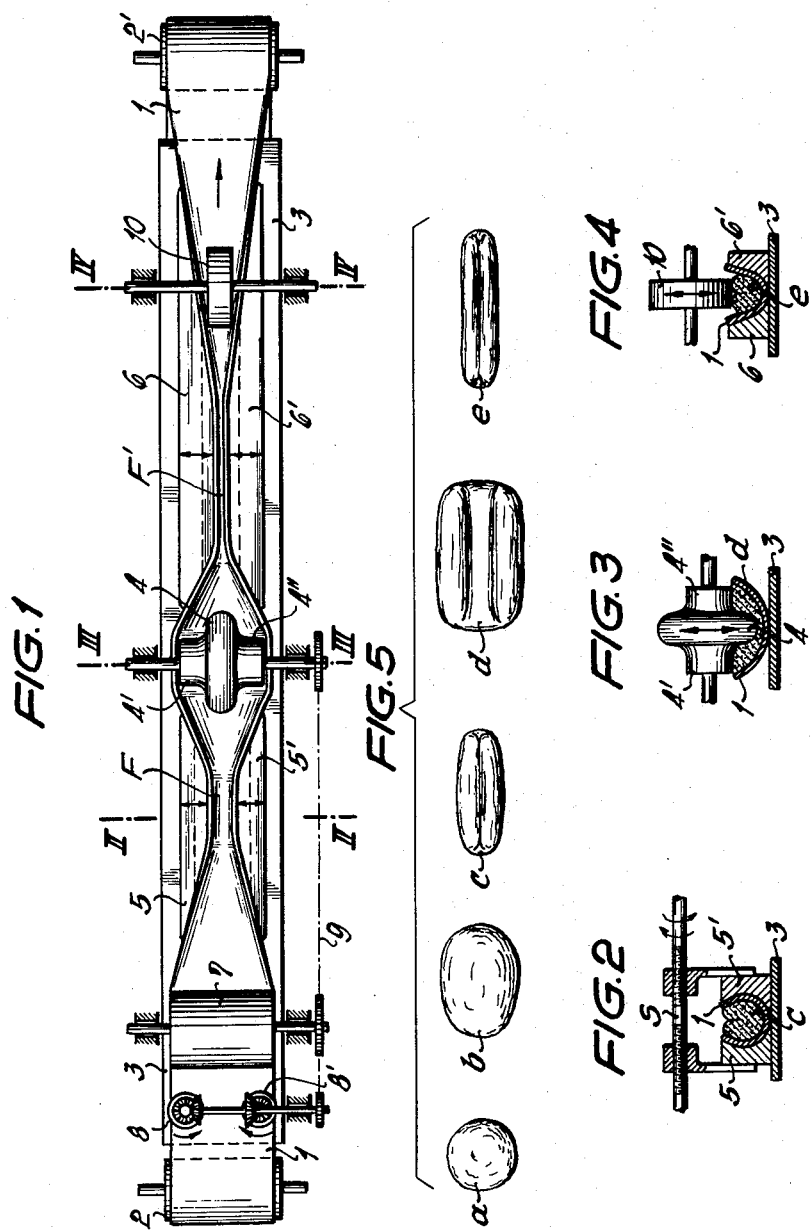
INVENTOR
GEROLD HUSS
By Hause and Nydich
ATTORNEYS _United States Patent Office_  
3,115,103  
Patented Dec. 24, 1963

1

3,115,103  
DOUGH-FORMING MACHINE  
Gerold Huss, Stuttgart-Ost, Germany, assignor to Werner & Pfleiderer G.m.b.H., Zug, Switzerland, a company of Switzerland  
Filed Jan. 8, 1962, Ser. No. 164,779  
Claims priority, application Germany Jan. 10, 1961  
9 Claims. (Cl. 107—9)

The invention relates to a machine for forming dough into the shape of rolls, and more particularly to a dough-forming machine in which the dough to be shaped is guided upon a horizontal section of an endless conveyor, and while being so guided is subjected to the action of a grooving roller to groove the pieces of dough lengthwise along their midlines, and in which a dough-forming means disposed posterior of the roller as seen in the direction of travel of the conveyor effects elongation of the pieces of dough.

Dough-forming machines of this kind as heretofore known are not entirely satisfactory, in that the forming actions to which the pieces of dough are subjected are not sufficiently effective to produce rolls of oblong shape (Berliner Schrippen). The pieces of dough as formed in machines as heretofore known have a tendency to become contracted in a lengthwise direction. In order to counteract such tendency and to assure that the rolls obtained after the baking of the dough are not substantially round but oblong (Berliner Schrippen), it has heretofore always been necessary to subject pieces of dough discharged from the forming machine to an after treatment for the purpose of elongating them. As a result, the now available dough-forming machines cannot be used for continuous and fully automatic production of oblong rolls (Berliner Schrippen).

It is a broad object of the present invention to provide a novel and improved dough-forming machine of the general type referred to above which permits continuous and fully automatic production of oblong rolls (Berliner Schrippen) and which discharges pieces of dough in a shape such that they can be directly, without further treatment, fed to a baking station or other station for further treatment.

According to the invention, a dough-forming station similar to the station heretofore provided only posterior of the grooving roller is provided also anterior of the grooving roller, and in addition, a dough-flattening means is preferably provided anterior of the second dough-forming means. As a result, the dough pieces, after leaving the machine, will no longer tend to contract lengthwise, and hence it is no longer necessary to subject the formed pieces to an after treatment, in particular a treatment effecting elongation thereof. Tests have shown that pieces of dough baked after being formed in a machine according to the invention have the desired shape of oblong rolls (Berliner Schrippen). As is evident, the forming action, especially the elongating action, to which the pieces of dough are subjected in a machine according to the invention is much more intensive than the forming action in a machine as heretofore known, since the pieces of dough not only are formed by the grooving roller, but also, prior to reaching said roller, are preformed by the flattening means, and are further formed anterior and posterior to the grooving roller by two dough-forming means. These forming means cause an upward folding of the marginal portions of the conveyor and thus also of the dough pieces when the latter are passing between the folded-up portions of the conveyor. The folding up of the conveyor portions anterior and posterior of the grooving roller is effected in the two forming means by elongated guide members which are so profiled that an intensive forming action upon the

2 dough pieces is assured. The transverse spacing of the guide members is preferably adjustable to permit setting of the guide members in accordance with the requirements of a specific forming operation. When the folded-up portions of the conveyor reach the grooving roller, these portions are more or less depressed by means of hubs laterally extending at both sides of the grooving roller. The distance of the grooving roller from the conveyor is preferably adjustable to vary the flattening of the folded-up portions of the conveyor in accordance with the requirements of the specific operation. The flattening action of the grooving roller, or more specifically of the hubs thereof, has the advantage that the two forming means can be placed close to the grooving roller, whereby the total length of the machine can be kept comparatively short. Due to the short distances between the anterior or first forming means and the grooving roller and between the grooving roller and the second or posterior forming means, dislocation of the pieces of dough and a resulting deformation of the same are made impossible for all practical purposes. The pieces of dough are gripped by the grooving roller before they have completely left the anterior forming means, and they are fed from the grooving roller to the posterior forming means before they have completely left the grooving roller.

According to a particularly advantageous embodiment of the invention, a guiding and calibrating means is provided anterior to the dough-flattening means. This guiding and calibrating means preferably comprises rollers the rotational axes of which are normal to the plane of the horizontal conveyor section and are power driven. Such guiding and calibrating means affords the advantage that the pieces of dough reach the flattening means not only accurately oriented for grooving along the lengthwise midline, but also accurately calibrated as to width.

A pressure roller is preferably provided at the discharge end of the posterior dough-folding means. This pressure roller serves to exert pressure upon the entire length of the formed pieces of dough to flatten them somewhat, whereby the pieces of dough, when discharged from the machine so that they fall upon a receiving surface with their grooved sides facing downward, remain in that position and have no tendency to tip over to one side or the other.

Other and further objects, features and advantages of the invention will be pointed out hereinafter and set forth in the appended claims constituting part of the application.

In the accompanying drawing a preferred embodiment of the invention is shown by way of illustration, and not by way of limitation.

In the drawing:

FIG. 1 is a plan view of a dough-forming machine of the invention, only the parts of the machine essential for an understanding of the invention being shown, in particular, a screw spindle for adjusting the guide members being omitted for the sake of clarity of illustration;

FIG. 2 is a section taken on line II—II of FIG. 1;

FIG. 3 is a section taken on line III—III of FG. 1;

FIG. 4 is a section taken on line IV—IV of FIG. 1, and

FIG. 5 shows the different configurations into which a piece of dough is shaped when passing through the machine.

Referring now to the figures in detail, the exemplified machine comprises a preferably endless conveyor band 1 guided over two rolls 2 and 2′, one of which is driven by any suitable means. The section of conveyor between the two rolls is guided over a horizontal plane support 3. A grooving roller 4 is mounted above the horizontal conveyor section at about the middle thereof.

Dough-forming stations F and F' are disposed anterior and posterior of grooving roller 4, as seen in the direction of travel of the conveyor, which direction is indicated by an arrow. The forming station F comprises elongated guiding members 5 and 5' which are disposed at opposite sides of conveyor band 1, spaced apart by a distance less than the width of the conveyor. Similarly, the forming station F' comprises guiding members 6 and 6'. The guiding members are profiled on the sides facing the conveyor so as to define a channeled cross section, which can best be seen in FIG. 2, thus forcing the marginal portions of the conveyor, when passing the forming stations, into a corresponding channeled cross section, as also shown in FIG. 2. The lateral spacing of the guiding members, and hence the cross-sectional configuration of the channel defined between each pair of guiding members, is preferably adjustable, for instance by means of a screw spindle S. As is evident, adjustment of the guiding members permits narrowing or broadening of the passages provided for the pieces of dough at the forming stations, as required.

A dough-flattening station in the form of roller 7 is provided anterior of the forming station F, and a dough-guiding and calibrating station is provided anterior of the flattening station. The dough-guiding and calibrating station comprises two rollers 8 and 8', the rotational axes of which are disposed normal to the plane of the conveyor section passing over the support 3. Rollers 8 and 8' are power driven, and if desired, rollers 7 and 4 also are power driven, for instance, by means of a common chain drive 9.

Grooving roller 4 is formed at both sides with hubs 4' and 4''. The hubs serve to flatten the conveyor somewhat between the two folding stations, and as is evident, the flattening action of the hubs depends upon the spacing of the grooving roller above support 3. Roller 4 should be visualized as being perpendicularly adjustable with reference to support 3, as is indicated in FIG. 3 by a double arrow. Any suitable and conventional adjustment means may be provided for the purpose. As is evident, the lower the roller 4 is set, the more the marginal portions of the conveyor 1 will be depressed by hubs 4' and 4'', and the deeper will be the groove formed in the piece of dough by the grooving roller.

The height of flattening roller 7 with reference to support 3 may also be made adjustable. Similarly, flattening roller 10 may be mounted adjustable as to its height above support 3, as is indicated in FIG. 4 by a double arrow. As is evident, adjustability of rollers 7 and 10 permits adjustment of the flattening action of said rollers as desired. Suitable means for adjusting the positions of rollers 7 and 10 may be readily visualized.

The operation of the machine hereinbefore described is as follows:

A piece of dough a (FIG. 5) which has been kneaded round in a suitable round kneading machine is placed in front of the guiding and calibrating station 8, 8'. It is not necessary to place the round piece of dough exactly in a centered position; the rollers of the guiding and calibrating station, rotation in the direction indicated by the arrows, will automatically pull the piece of dough into the correct position; that is, a piece of dough fed to the station will be automatically placed on the lengthwise midline of the horizontal conveyor section. Furthermore, the guiding and calibrating station will automatically calibrate each piece of dough passing through it to the same width. Hence, roller 7 will flatten each piece of dough into an oblong shape of substantially the same configuration. The shape of a piece of dough after leaving roller 7 is indicated at b in FIG. 5.

While passing through the first or anterior forming station F the dough piece b is folded lengthwise and also elongated; it then has the shape c. The dough piece c reaches the grooving roller 4 just before it completely leaves the forming station F. Consequently, the dough piece c, at least at the moment at which it enters the pass of the grooving roller 4, is still held in the forming station F, so that it cannot become dislocated toward one or the other side, but will pass under roller 4 correctly oriented lengthwise along the midline of the conveyor section, so that it will always be grooved along its lengthwise midline. While passing roller 4 the piece of dough is further elongated, and now attains the shape d. Passage of the dough piece d into the posterior forming station F' occurs before the piece of dough is completely released by roller 4. As a result, it is absolutely certain that the further transverse action upon the piece of dough and the simultaneous further elongation thereof always so occur that the lengthwise grooving of the dough and the seam caused by the lateral pressure to which the dough was subjected while passing through the folding station F' are always located in the lengthwise midline of the piece of dough and also located accurately in the lengthwise midline of the horizontal conveyor section.

The piece of dough has now attained the configuration e. This configuration constitutes the completion of the forming operation, but it is advisable to flatten the piece somewhat by means of roller 10, primarily for the purpose of assuring that when the piece of dough is discharged from the conveyor and falls upon a receiving surface with its seamed and grooved side facing downwardly, it remains in that position and does not have a tendency to fall over toward one side or the other.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

I claim:

1. A dough-forming machine for forming dough in the form of oblong rolls, said machine comprising a conveyor made of pliable material and including a section traveling along a plane horizontal path, a grooving roller stationarily mounted above said plane conveyor section for grooving a groove lengthwise of said conveyor section in a piece of dough traveling on said section, a first dough-forming means stationarily mounted above said conveyor section anterior of said grooving roller as seen in the direction of travel of said conveyor station, said forming means exerting pressure upon the piece of dough at both sides thereof to elongate said piece before the same reaches the grooving roller, and a second dough-forming means stationarily mounted above said conveyor section posterior of said grooving roller, said second dough-forming means also exerting pressure upon both sides of the piece of dough to elongate the same further after said piece passes the grooving roller, said first and second dough-forming means being disposed anterior and posterior of said grooving roller at spacings in reference to the roller such that a piece of dough reaches the grooving roller before completely leaving the first dough-forming means and reaches the second dough-forming means before completely leaving the grooving roller.

2. A dough-forming machine according to claim 1 and further comprising a dough-flattening means stationarily disposed anterior of said first dough-forming means, said dough-flattening means exerting pressure upon the top surface of said piece of dough to flatten the same before said piece reaches said first dough-forming means.

3. A dough-forming machine according to claim 1, wherein each of said dough-forming means comprises a pair of elongated guide members oppositely disposed lengthwise of said conveyor section spaced apart from each other a distance less than the width of said conveyor section, the guide members of each of said pairs forcing the marginal portions of the conveyor section into upwardly folded configurations when and while said section passes the dough-forming means, whereby the folded portions of the conveyor section effect folding and elongation of the piece of dough.

4. A dough-forming machine according to claim 3, wherein the facing surfaces of the guide members of each pair are profiled to define a channel-shaped cross section therebetween.

5. A dough-forming machine according to claim 3 and further comprising adjustment means for varying the spacing of the guide members of each pair.

6. A dough-forming machine according to claim 1, wherein each of said dough-forming means comprises a pair of elongated guide members oppositely disposed lengthwise of said conveyor section spaced apart from each other a distance less than the width of said conveyor section, the guide members of each of said pairs forcing the marginal portions of the conveyor section into upwardly folded configurations when and while said section passes the dough-forming means, and wherein said grooving roller comprises a peripheral rib for effecting grooving of the piece of dough, and laterally protruding hubs for depressing the upwardly folded marginal portions of the conveyor section while and when said portions are traveling from the first forming means to the second forming means, and comprising mounting means supporting said roller rotatable about an axis transverse of said conveyor section, said rib of the roller being disposed parallel to the lengthwise midline of said conveyor section.

7. A dough-forming machine according to claim 1, further comprising a dough-flattening means stationarily disposed anterior of said first forming means, said dough-flattening means exerting pressure upon the top surface of said piece of dough to flatten the same before said piece reaches said first dough-forming means, and guiding and calibrating means disposed anterior of said dough-flattening means, said guiding and calibrating means guiding a piece of dough reaching said means on the conveyor section into a position on the lengthwise midline of the conveyor section and reducing the width of said elongated piece of dough to a predetermined maximum width.

8. A dough-forming machine according to claim 7, wherein said guiding and calibrating means comprises a pair of driven rollers rotatable about axes perpendicular to the plane of said conveyor section, said rollers being disposed above said conveyor section transversely spaced apart from each other in the direction of travel of the conveyor for drawing a piece of dough between the rollers to orient and calibrate said piece as to lengthwise position and crosswise width.

9. A dough-forming machine according to claim 1 and further comprising a dough-flattening means stationarily disposed above said conveyor section posterior of said second forming means to flatten a piece of dough discharged from said second forming means.

References Cited in the file of this patent

FOREIGN PATENTS 199,189    Great Britain _____ June 21, 1923

OTHER REFERENCES

German application W8,947, printed May 17, 1956 (Kl. 2b 7).

German application 1,102,062, printed Mar. 16, 1961 (Kl. 2b 7).